United States Patent
Jung et al.

(10) Patent No.: US 10,264,514 B2
(45) Date of Patent: Apr. 16, 2019

(54) METHOD FOR ACCESS CONTROL IN WIRELESS COMMUNICATION SYSTEM AND APPARATUS SUPPORTING SAME

(71) Applicant: LG ELECTRONICS INC., Seoul (KR)

(72) Inventors: Sunghoon Jung, Seoul (KR); Youngdae Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 15/329,995

(22) PCT Filed: Jul. 27, 2015

(86) PCT No.: PCT/KR2015/007814
§ 371 (c)(1),
(2) Date: Jan. 27, 2017

(87) PCT Pub. No.: WO2016/018021
PCT Pub. Date: Feb. 4, 2016

(65) Prior Publication Data
US 2017/0273007 A1    Sep. 21, 2017

Related U.S. Application Data

(60) Provisional application No. 62/030,033, filed on Jul. 28, 2014.

(51) Int. Cl.
*H04L 29/08* (2006.01)
*H04W 28/02* (2009.01)
(Continued)

(52) U.S. Cl.
CPC .......... *H04W 48/06* (2013.01); *H04L 67/322* (2013.01); *H04W 48/08* (2013.01); *H04W 28/02* (2013.01);
(Continued)

(58) Field of Classification Search
CPC . H04W 72/10; H04W 28/02; H04W 28/0289; H04W 48/02
See application file for complete search history.

(56) References Cited

U.S. PATENT DOCUMENTS

2012/0117140 A1* 5/2012 Wang ............... H04W 4/005
 709/201
2015/0195712 A1* 7/2015 Pinheiro ............. H04W 12/08
 455/411

(Continued)

FOREIGN PATENT DOCUMENTS

KR   1020100021647   2/2010
KR   1020110016918   2/2011
(Continued)

OTHER PUBLICATIONS

PCT International Application No. PCT/KR2015/007814, International Search Report dated Nov. 5, 2015, 2 pages.
(Continued)

*Primary Examiner* — Jaime M Holliday
(74) *Attorney, Agent, or Firm* — Lee Hong Degerman Kang Waimey

(57) ABSTRACT

Provided is a method for access control performed by a terminal in a wireless communication system and an apparatus using the method. The method comprises: acquiring service specific access control information (SSACI) on an application; determining whether prioritization access control information (PACI) can be applied to the application; and when the PACI is determined to be applicable, performing an access control for the application by preferentially applying the PACI than the SSACI.

4 Claims, 11 Drawing Sheets

(51) Int. Cl.
*H04W 48/02* (2009.01)
*H04W 48/06* (2009.01)
*H04W 48/08* (2009.01)
*H04W 72/10* (2009.01)

(52) U.S. Cl.
CPC ........ *H04W 28/0289* (2013.01); *H04W 48/02* (2013.01); *H04W 72/10* (2013.01)

(56) References Cited

U.S. PATENT DOCUMENTS

2016/0014632 A1* 1/2016 Siow .................... H04L 5/0085
370/230
2016/0212653 A1* 7/2016 Wang ................. A61B 10/0051

FOREIGN PATENT DOCUMENTS

| KR | 1020130059121 | 6/2013 |
| KR | 1020130112664 | 10/2013 |
| WO | 2013112976 | 8/2013 |

OTHER PUBLICATIONS

3rd Generation Partnership Project (3GPP), "Technical Specification Group Radio Access Network; Evolved Universal Terrestrial Radio Access (E-UTRA); User Equipment (UE) procedures in idle mode (Release 8)," 3GPP TS 36.304 V8.5.0, Mar. 2009, 30 pages.

* cited by examiner

METHOD FOR ACCESS CONTROL IN WIRELESS COMMUNICATION SYSTEM AND APPARATUS SUPPORTING SAME

CROSS-REFERENCE TO RELATED APPLICATIONS

This application is the National Stage filing under 35 U.S.C. 371 of International Application No. PCT/KR2015/ 007814, filed on Jul. 27, 2015, which claims the benefit of U.S. Provisional Application No. 62/030,033, filed on Jul. 28, 2014, the contents of which are all hereby incorporated by reference herein in their entirety.

BACKGROUND OF THE INVENTION

Field of the Invention

The present invention relates to wireless communication and, more particularly, to a method for access control in a wireless communication system and apparatus for supporting the same.

Related Art

3GPP ($3^{rd}$ generation partnership project) LTE (long term evolution), which is an improved version of UMTS (universal mobile telecommunications system), is introduced as 3GPP release 8. The 3GPP LTE uses OFDMA (orthogonal frequency division multiple access) in the downlink (DL) and uses SC-FDMA (single carrier-frequency division multiple access) in the uplink (UL). MIMO (multiple input multiple output) having the maximum 4 antennas is employed. Recently, 3GPP LTE-A (LTE-advanced), which is an improved version of 3GPP LTE, is under discussion.

The quality of the service, which is currently provided to a user equipment (UE), may be deteriorated due to the mobility of the UE as a mobile device, or a cell capable of providing a better service may be sensed. Hence, the UE may be moved to a new cell, and such an operation is called the movement of the UE. The UE may select a cell on the same frequency, a cell on a different frequency, or a different RAT (radio access technology) cell and move to the corresponding cell.

When an UE attempts connection establishment in order to have an access to a network, whether to allow the access may be controlled, which is called an access control. The access may be controlled according to the service related to the access to the network.

If the situation reaches confusion state due to the increase of the random access load, an access class barring (ACB) may be used. The ACB is a method capable of controlling a random approach of the UE depending on the access class (AC) to which the UE belongs. A base station may broadcast an ACB-related parameter as a part of system information at regular intervals. This parameter includes a barring factor and barring time. The barring factor is a probability value between 0 and 1, which determines whether to block a random access when the network is overloaded. A UE desiring an approach to the network generates a random number between 0 and 1, and when this random number is smaller than the barring factor, the access is attempted, and otherwise the access is blocked. The blocking time is the average time for which the UE stands by until a random approach blocked by the ABC is attempted again.

Meanwhile, the applications used by the UE are associated with an appropriate service class by the criteria such as required quality of service (QoS) and a traffic distinction rule. And, information for access control and parameters are provided depending on the service class.

However, even though applications for public safety or new applications may be associated with the same service class according to the criteria such as required QoS, traffic distinction rule and the like, it may be necessary for the access probability to be differently applied depending on the importance or urgency.

SUMMARY OF THE INVENTION

The present invention provides a method for access control in a wireless communication system and apparatus for supporting the same.

In an aspect, a method for access control performed by a user equipment (UE) in a wireless communication system is provided. The method comprises obtaining service-specific access control information (SSACI) for an application, determining whether prioritization access control information (PACI) is applicable to the application and performing access control for the application by applying the PACI prior to the SACI when the PACI is applicable.

When the PACI is applicable, the SSACI may be replaced with the PACI.

When the PACI is applicable, a parameter indicated by the SSACI may be replaced with a parameter indicated by the PACI.

The application may be associated with a specific service class.

A plurality of applications may be associated with the specific service class.

The application may be associated with a service class having a same priority as a priority of the application set therein.

One or more PACIs associated with a priority within the service class may be set for a service class associated with the application and wherein if there is a specific PACI associated with the priority of the application among the one or more PACIs, it is determined that the specific PACI is applicable to the application.

The PACI may comprise at least one parameter among a barring factor or barring time.

When the PACI is applicable, a parameter included in the PACI may be added to some of parameters included in the SSACI.

When the PACI is applicable, values of some of parameters included in the SSACI may be scaled using a value of a parameter included in the PACI.

In another aspect, a wireless apparatus operating in a wireless communication system is provided. The wireless apparatus may comprises a radio frequency (RF) unit that transmits and receives a wireless signal and a processor operating in functional combination with the RF unit, wherein the processor that: obtains service-specific control information (SSACI) for an application, determines whether prioritization access control information (PACI) is applicable to the application, and performs access control for the application by applying the PACI prior to the SSACI when the PACI is applicable.

According to the embodiment of the present invention, it is possible to provide the access control information according to the priority order among a plurality of applications belonging to the same application group or the same service class, thereby providing/controlling an appropriate access probability.

DESCRIPTION OF EXEMPLARY EMBODIMENTS

Figure 1:
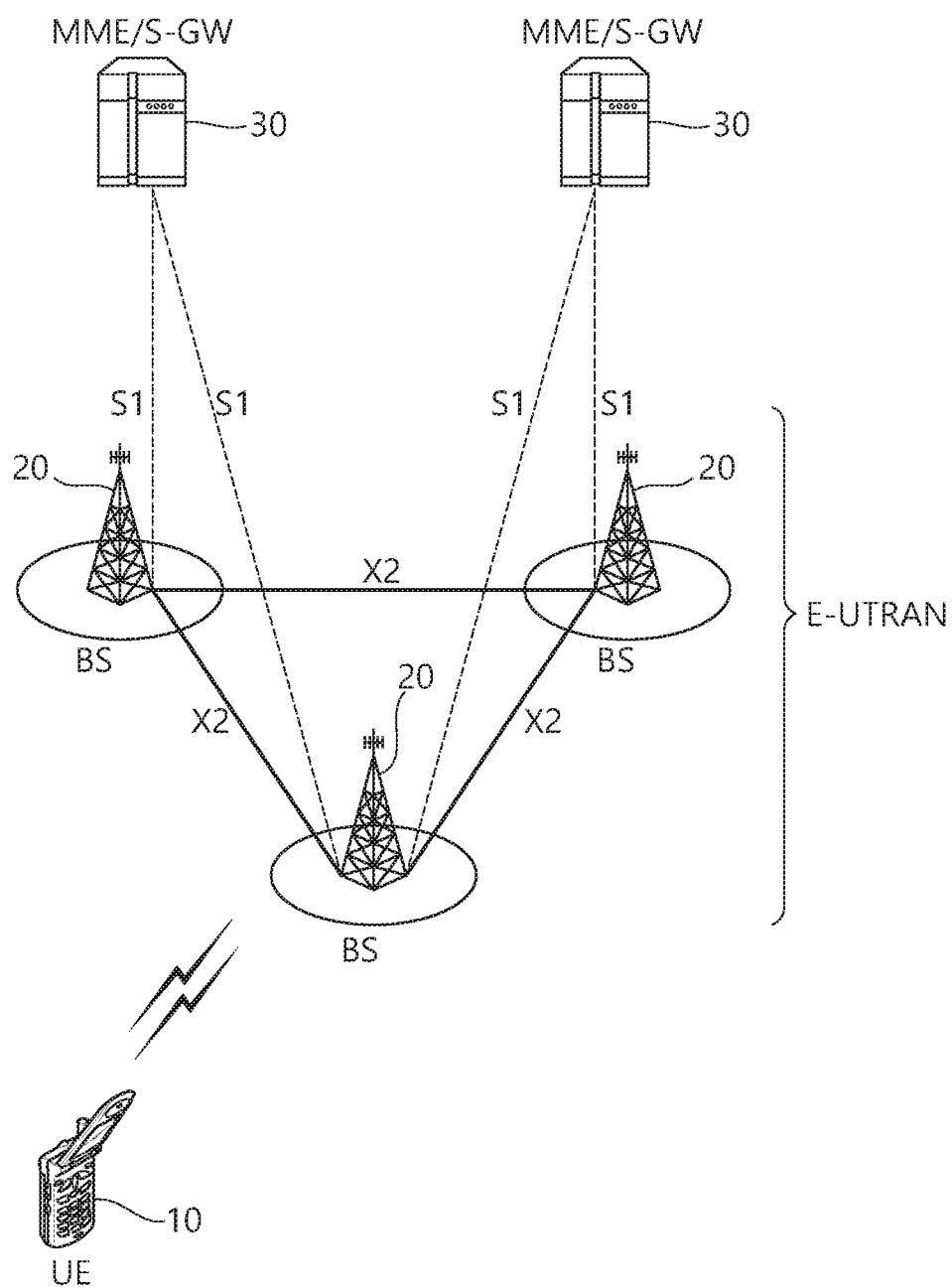
FIG. 1 shows a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
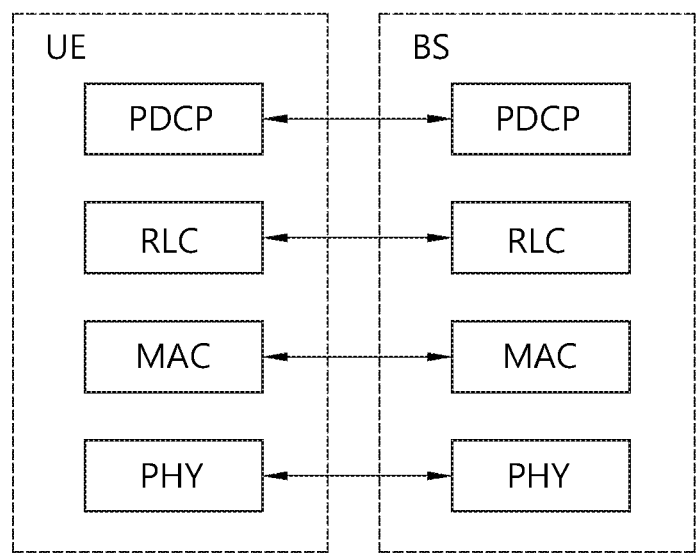
FIG. 2 is a diagram showing a wireless protocol architecture for a user plane.
Figure 3:
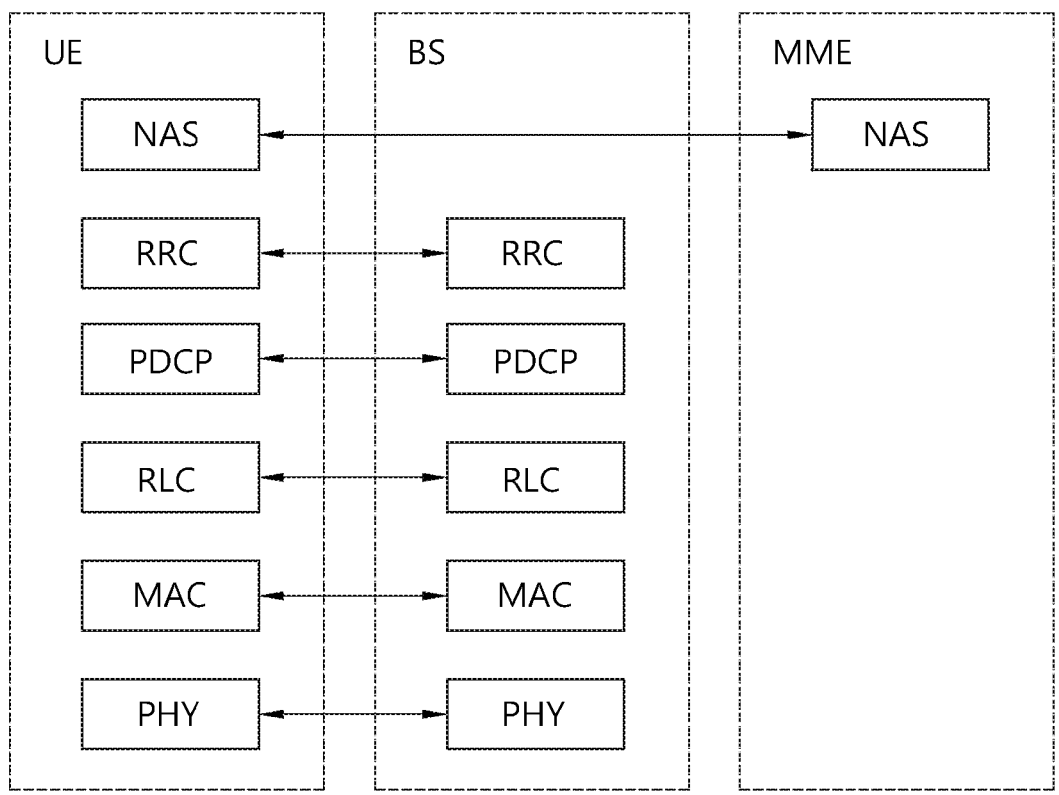
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a process of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

The RRC state of UE and an RRC connection method are described below.

The RRC state means whether or not the RRC layer of UE is logically connected to the RRC layer of the E-UTRAN. A case where the RRC layer of UE is logically connected to the RRC layer of the E-UTRAN is referred to as an RRC connected state. A case where the RRC layer of UE is not logically connected to the RRC layer of the E-UTRAN is referred to as an RRC idle state. The E-UTRAN may check the existence of corresponding UE in the RRC connected state in each cell because the UE has RRC connection, so the UE may be effectively controlled. In contrast, the E-UTRAN is unable to check UE in the RRC idle state, and a Core Network (CN) manages UE in the RRC idle state in each tracking area, that is, the unit of an area greater than a cell. That is, the existence or non-existence of UE in the RRC idle state is checked only for each large area. Accordingly, the UE needs to shift to the RRC connected state in order to be provided with common mobile communication service, such as voice or data.

When a user first powers UE, the UE first searches for a proper cell and remains in the RRC idle state in the corresponding cell. The UE in the RRC idle state establishes RRC connection with an E-UTRAN through an RRC connection procedure when it is necessary to set up the RRC connection, and shifts to the RRC connected state. A case where UE in the RRC idle state needs to set up RRC connection includes several cases. For example, the cases may include a need to send uplink data for a reason, such as a call attempt by a user, and to send a response message as a response to a paging message received from an E-UTRAN.

A Non-Access Stratum (NAS) layer placed over the RRC layer performs functions, such as session management and mobility management.

In the NAS layer, in order to manage the mobility of UE, two types of states: EPS Mobility Management-REGISTERED (EMM-REGISTERED) and EMM-DEREGISTERED are defined. The two states are applied to UE and the MME. UE is initially in the EMM-DEREGISTERED state. In order to access a network, the UE performs a process of registering it with the corresponding network through an initial attach procedure. If the attach procedure is successfully performed, the UE and the MME become the EMM-REGISTERED state.

In order to manage signaling connection between UE and the EPC, two types of states: an EPS Connection Management (ECM)-IDLE state and an ECM-CONNECTED state are defined. The two states are applied to UE and the MME. When the UE in the ECM-IDLE state establishes RRC connection with the E-UTRAN, the UE becomes the ECM-CONNECTED state. The MME in the ECM-IDLE state becomes the ECM-CONNECTED state when it establishes S1 connection with the E-UTRAN. When the UE is in the ECM-IDLE state, the E-UTRAN does not have information about the context of the UE. Accordingly, the UE in the ECM-IDLE state performs procedures related to UE-based mobility, such as cell selection or cell reselection, without a need to receive a command from a network. In contrast, when the UE is in the ECM-CONNECTED state, the mobility of the UE is managed in response to a command from a network. If the location of the UE in the ECM-IDLE state is different from a location known to the network, the UE informs the network of its corresponding location through a tracking area update procedure.

System information is described below.

System information includes essential information that needs to be known by UE in order for the UE to access a BS. Accordingly, the UE needs to have received all pieces of system information before accessing the BS, and needs to always have the up-to-date system information. Furthermore, the BS periodically transmits the system information because the system information is information that needs to be known by all UEs within one cell. The system information is divided into a Master Information Block (MIB) and a plurality of System Information Blocks (SIBs).

The MIB may include a limited number of parameters that are most essential and most frequently transmitted when other information is required to be obtained from a cell. UE first searches for an MIB after downlink synchronization. The MIB may include information, such as an SFN that supports downlink channel bandwidth, a PHICH configuration, and synchronization and operates as a timing criterion and an eNB transmit antenna configuration. The MIB may be transmitted on a broadcast channel (BCH) through broadcasting.

SystemInformationBlockType1 (SIB1) of included SIBs is included in a "SystemInformationBlockType1" message and transmitted. The remaining SIBs other than the SIB1 is included in a system information message and transmitted. To map the SIBs to the system information message may be flexibly configured by a scheduling information list parameter included in the SIB1. In this case, each of the SIBs is included in a single system information message, and only SIBs having the same scheduling requirement value (e.g. cycle) may be mapped to the same system information message. Furthermore, a SystemInformationBlockType2 (SIB2) is always mapped to a system information message corresponding to the first entry within the system information message list of a scheduling information list. A plurality of system information messages may be transmitted within the same cycle. The SIB1 and all the system information messages are transmitted on a DL-SCH.

In addition to broadcast transmission, in an E-UTRAN, the SIB1 may be dedicated-signaled in the state in which it includes a parameter configured like an existing configured value. In this case, the SIB1 may be included in an RRC connection reconfiguration message and transmitted.

The SIB1 includes information related to UE cell access, and defines the scheduling of other SIB s. The SIB1 may include information related to the PLMN identifiers of a network, tracking area code (TAC) and a cell ID, a cell barring status indicative of whether a cell is a cell on which camp-on is possible, the lowest reception level required within a cell which is used as cell reselection criterion, and the transmission time and cycle of other SIBs.

The SIB2 may include radio resource configuration information common to all pieces of UE. The SIB2 may include information related to an uplink carrier frequency and uplink channel bandwidth, an RACH configuration, a page configuration, an uplink power control configuration, a sounding reference signal configuration, a PUCCH configuration supporting ACK/NACK transmission, and a PUSCH configuration.

UE may apply a procedure for obtaining system information and detecting a change of system information to a primary cell (PCell) only. In a secondary cell (SCell), when a corresponding SCell is added, an E-UTRAN may provide all of pieces of system information related to an RRC connection state operation through dedicated signaling. When system information related to a configured SCell is changed, an E-UTRAN may release an SCell that is taken into consideration and subsequently add the changed system information. This may be performed along with a single RRC connection reconfiguration message. An E-UTRAN may configure parameter values different from a value broadcasted within an SCell that has been taken into consideration through dedicated signaling.

UE needs to guarantee the validity of a specific type of system information, and such system information is called required system information. The required system information may be defined as follows.

If UE is an RRC idle state: The UE needs to be guaranteed so that it has the valid versions of the MIB and the SIB1 in addition to the SIB2 to SIB8. This may comply with the support of a radio access technology (RAT) that is taken into consideration.

If UE is an RRC connection state: The UE needs to be guaranteed so that it has the valid versions of the MIB, the SIB1, and the SIB2.

In general, the validity of system information may be guaranteed up to a maximum of 3 hours after the system information is obtained.

In general, service that is provided to UE by a network may be classified into three types as follows. Furthermore, the UE differently recognizes the type of cell depending on what service may be provided to the UE. In the following description, a service type is first described, and the type of cell is described.

1) Limited service: this service provides emergency calls and an Earthquake and Tsunami Warning System (ETWS), and may be provided by an acceptable cell.

2) Suitable service: this service means public service for common uses, and may be provided by a suitable cell (or a normal cell).

3) Operator service: this service means service for communication network operators. This cell may be used by only communication network operators, but may not be used by common users.

In relation to a service type provided by a cell, the type of cell may be classified as follows.

1) An acceptable cell: this cell is a cell from which UE may be provided with limited service. This cell is a cell that has not been barred from a viewpoint of corresponding UE and that satisfies the cell selection criterion of the UE.

2) A suitable cell: this cell is a cell from which UE may be provided with suitable service. This cell satisfies the conditions of an acceptable cell and also satisfies additional conditions. The additional conditions include that the suitable cell needs to belong to a Public Land Mobile Network (PLMN) to which corresponding UE may access and that the suitable cell is a cell on which the execution of a tracking area update procedure by the UE is not barred. If a corresponding cell is a CSG cell, the cell needs to be a cell to which UE may access as a member of the CSG.

3) A barred cell: this cell is a cell that broadcasts information indicative of a barred cell through system information.

4) A reserved cell: this cell is a cell that broadcasts information indicative of a reserved cell through system information.

Figure 4:
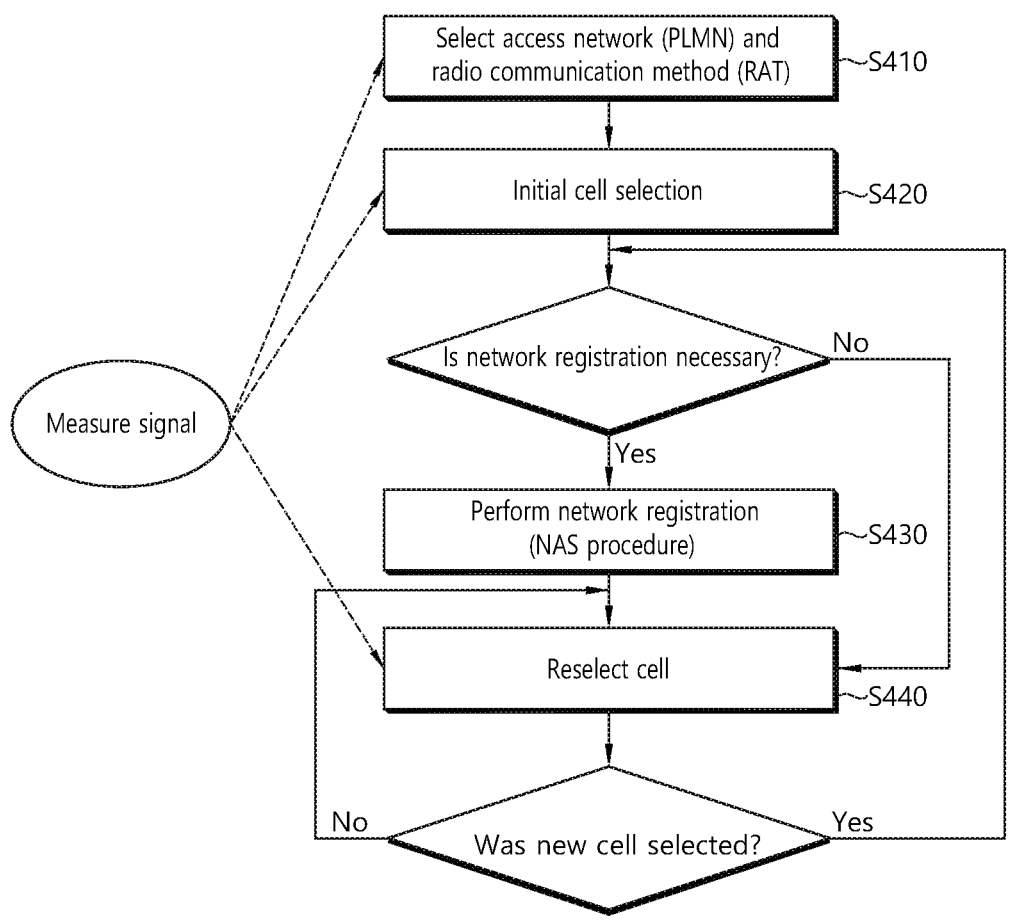
FIG. 4 is a flowchart illustrating the operation of UE in the RRC idle state.

FIG. 4 is a flowchart illustrating the operation of UE in the RRC idle state. FIG. 4 illustrates a procedure in which UE that is initially powered on experiences a cell selection process, registers it with a network, and then performs cell reselection if necessary.

Referring to FIG. 4, the UE selects Radio Access Technology (RAT) in which the UE communicates with a Public Land Mobile Network (PLMN), that is, a network from which the UE is provided with service (S410). Information about the PLMN and the RAT may be selected by the user of the UE, and the information stored in a Universal Subscriber Identity Module (USIM) may be used.

The UE selects a cell that has the greatest value and that belongs to cells having measured BS and signal intensity or quality greater than a specific value (cell selection) (S420). In this case, the UE that is powered off performs cell selection, which may be called initial cell selection. A cell selection procedure is described later in detail. After the cell selection, the UE receives system information periodically by the BS. The specific value refers to a value that is defined in a system in order for the quality of a physical signal in data transmission/reception to be guaranteed. Accordingly, the specific value may differ depending on applied RAT.

If network registration is necessary, the UE performs a network registration procedure (S430). The UE registers its information (e.g., an IMSI) with the network in order to receive service (e.g., paging) from the network. The UE does not register it with a network whenever it selects a cell, but registers it with a network when information about the network (e.g., a Tracking Area Identity (TAI)) included in system information is different from information about the network that is known to the UE.

The UE performs cell reselection based on a service environment provided by the cell or the environment of the UE (S440). If the value of the intensity or quality of a signal measured based on a BS from which the UE is provided with service is lower than that measured based on a BS of a neighboring cell, the UE selects a cell that belongs to other cells and that provides better signal characteristics than the cell of the BS that is accessed by the UE. This process is called cell reselection differently from the initial cell selection of the No. 2 process. In this case, temporal restriction conditions are placed in order for a cell to be frequently reselected in response to a change of signal characteristic. A cell reselection procedure is described later in detail.

Figure 5:
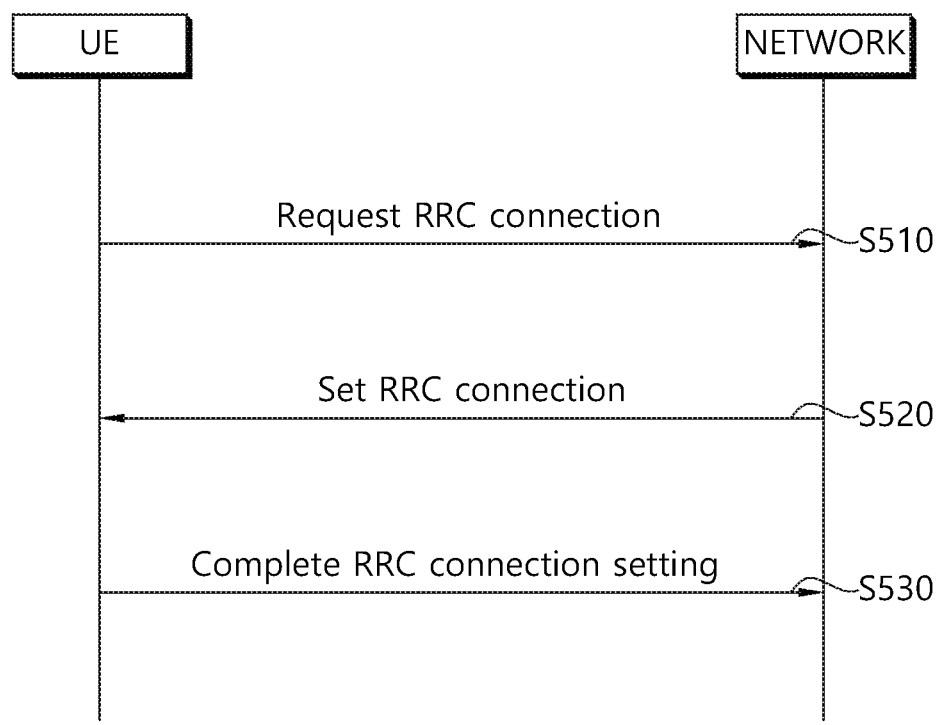
FIG. 5 is a flowchart illustrating a process of establishing RRC connection.

FIG. 5 is a flowchart illustrating a process of establishing RRC connection.

UE sends an RRC connection request message that requests RRC connection to a network (S510). The network sends an RRC connection establishment message as a response to the RRC connection request (S520). After receiving the RRC connection establishment message, the UE enters RRC connected mode.

The UE sends an RRC connection establishment complete message used to check the successful completion of the RRC connection to the network (S530).

Figure 6:
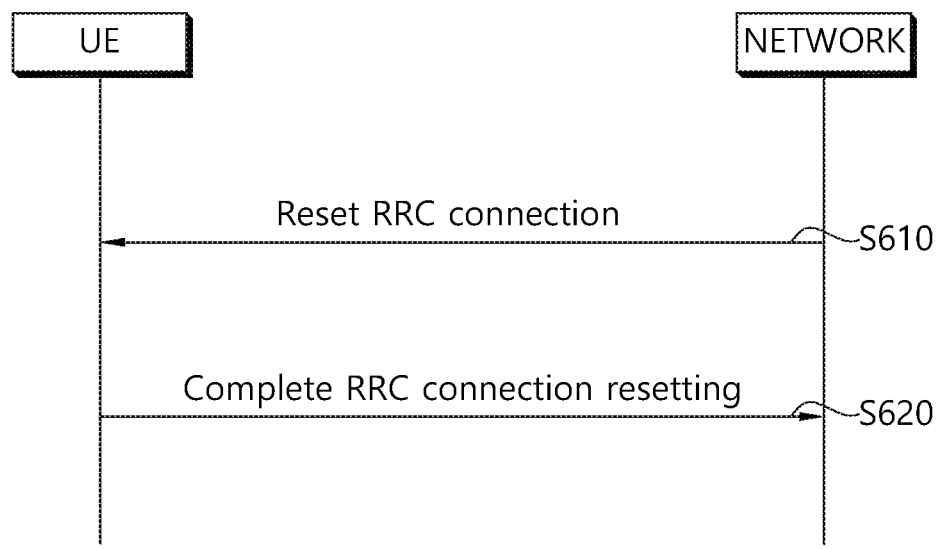
FIG. 6 is a flowchart illustrating an RRC connection reconfiguration process.

FIG. 6 is a flowchart illustrating an RRC connection reconfiguration process. An RRC connection reconfiguration is used to modify RRC connection. This is used to establish/modify/release RB s, perform handover, and set up/modify/release measurements.

A network sends an RRC connection reconfiguration message for modifying RRC connection to UE (S610). As a response to the RRC connection reconfiguration message, the UE sends an RRC connection reconfiguration complete message used to check the successful completion of the RRC connection reconfiguration to the network (S620).

Hereinafter, a public land mobile network (PLMN) is described.

The PLMN is a network which is disposed and operated by a mobile network operator. Each mobile network operator operates one or more PLMNs. Each PLMN may be identified by a Mobile Country Code (MCC) and a Mobile Network Code (MNC). PLMN information of a cell is included in system information and broadcasted.

In PLMN selection, cell selection, and cell reselection, various types of PLMNs may be considered by the terminal.

Home PLMN (HPLMN): PLMN having MCC and MNC matching with MCC and MNC of a terminal IMSI.

Equivalent HPLMN (EHPLMN): PLMN serving as an equivalent of an HPLMN.

Registered PLMN (RPLMN): PLMN successfully finishing location registration.

Equivalent PLMN (EPLMN): PLMN serving as an equivalent of an RPLMN.

Each mobile service consumer subscribes in the HPLMN. When a general service is provided to the terminal through the HPLMN or the EHPLMN, the terminal is not in a roaming state. Meanwhile, when the service is provided to the terminal through a PLMN except for the HPLMN/EHPLMN, the terminal is in the roaming state. In this case, the PLMN refers to a Visited PLMN (VPLMN).

When UE is initially powered on, the UE searches for available Public Land Mobile Networks (PLMNs) and selects a proper PLMN from which the UE is able to be provided with service. The PLMN is a network that is deployed or operated by a mobile network operator. Each mobile network operator operates one or more PLMNs. Each PLMN may be identified by Mobile Country Code (MCC) and Mobile Network Code (MNC). Information about the PLMN of a cell is included in system information and broadcasted. The UE attempts to register it with the selected PLMN. If registration is successful, the selected PLMN becomes a Registered PLMN (RPLMN). The network may signalize a PLMN list to the UE. In this case, PLMNs included in the PLMN list may be considered to be PLMNs, such as RPLMNs. The UE registered with the network needs to be able to be always reachable by the network. If the UE is in the ECM-CONNECTED state (identically the RRC connection state), the network recognizes that the UE is being provided with service. If the UE is in the ECM-IDLE state (identically the RRC idle state), however, the situation of the UE is not valid in an eNB, but is stored in the MME. In such a case, only the MME is informed of the location of the UE in the ECM-IDLE state through the granularity of the list of Tracking Areas (TAs). A single TA is identified by a Tracking Area Identity (TAI) formed of the identifier of a PLMN to which the TA belongs and Tracking Area Code (TAC) that uniquely expresses the TA within the PLMN.

Thereafter, the UE selects a cell that belongs to cells provided by the selected PLMN and that has signal quality and characteristics on which the UE is able to be provided with proper service.

The following is a detailed description of a procedure of selecting a cell by a terminal.

When power is turned-on or the terminal is located in a cell, the terminal performs procedures for receiving a service by selecting/reselecting a suitable quality cell.

A terminal in an RRC idle state should prepare to receive a service through the cell by always selecting a suitable quality cell. For example, a terminal where power is turned-on just before should select the suitable quality cell to be registered in a network. If the terminal in an RRC connection state enters in an RRC idle state, the terminal should selects a cell for stay in the RRC idle state. In this way, a procedure of selecting a cell satisfying a certain condition by the terminal in order to be in a service idle state such as the RRC idle state refers to cell selection. Since the cell selection is performed in a state that a cell in the RRC idle state is not currently determined, it is important to select the cell as rapid as possible. Accordingly, if the cell provides a wireless signal quality of a predetermined level or greater, although the cell does not provide the best wireless signal quality, the cell may be selected during a cell selection procedure of the terminal.

A method and a procedure of selecting a cell by a terminal in a 3GPP LTE is described with reference to 3GPP TS36.304 V8.5.0 (2009-03) "User Equipment (UE) procedures in idle mode (Release 8)".

A cell selection process is basically divided into two types.

The first is an initial cell selection process. In this process, UE does not have preliminary information about a wireless channel. Accordingly, the UE searches for all wireless channels in order to find out a proper cell. The UE searches for the strongest cell in each channel. Thereafter, if the UE has only to search for a suitable cell that satisfies a cell selection criterion, the UE selects the corresponding cell.

Next, the UE may select the cell using stored information or using information broadcasted by the cell. Accordingly, cell selection may be fast compared to an initial cell selection process. If the UE has only to search for a cell that satisfies the cell selection criterion, the UE selects the corresponding cell. If a suitable cell that satisfies the cell selection criterion is not retrieved though such a process, the UE performs an initial cell selection process.

After the UE selects a specific cell through the cell selection process, the intensity or quality of a signal between the UE and a BS may be changed due to a change in the mobility or wireless environment of the UE. Accordingly, if the quality of the selected cell is deteriorated, the UE may select another cell that provides better quality. If a cell is reselected as described above, the UE selects a cell that provides better signal quality than the currently selected cell. Such a process is called cell reselection. In general, a basic object of the cell reselection process is to select a cell that provides UE with the best quality from a viewpoint of the quality of a radio signal.

In addition to the viewpoint of the quality of a radio signal, a network may determine priority corresponding to each frequency, and may inform the UE of the determined priorities. The UE that has received the priorities preferentially takes into consideration the priorities in a cell reselection process compared to a radio signal quality criterion.

As described above, there is a method of selecting or reselecting a cell according to the signal characteristics of a wireless environment. In selecting a cell for reselection when a cell is reselected, the following cell reselection methods may be present according to the RAT and frequency characteristics of the cell.

Intra-frequency cell reselection: UE reselects a cell having the same center frequency as that of RAT, such as a cell on which the UE camps on.

Inter-frequency cell reselection: UE reselects a cell having a different center frequency from that of RAT, such as a cell on which the UE camps on Inter-RAT cell reselection: UE reselects a cell that uses RAT different from RAT on which the UE camps The principle of a cell reselection process is as follows.

First, UE measures the quality of a serving cell and neighbor cells for cell reselection.

Second, cell reselection is performed based on a cell reselection criterion. The cell reselection criterion has the following characteristics in relation to the measurements of a serving cell and neighbor cells.

Intra-frequency cell reselection is basically based on ranking. Ranking is a task for defining a criterion value for evaluating cell reselection and numbering cells using criterion values according to the size of the criterion values. A cell having the best criterion is commonly called the best-ranked cell. The cell criterion value is based on the value of a corresponding cell measured by UE, and may be a value to which a frequency offset or cell offset has been applied, if necessary.

Inter-frequency cell reselection is based on frequency priority provided by a network. UE attempts to camp on a frequency having the highest frequency priority. A network may provide frequency priority that will be applied by UEs within a cell in common through broadcasting signaling, or may provide frequency-specific priority to each UE through UE-dedicated signaling. A cell reselection priority provided through broadcast signaling may refer to a common priority. A cell reselection priority for each terminal set by a network may refer to a dedicated priority. If receiving the dedicated priority, the terminal may receive a valid time associated with the dedicated priority together. If receiving the dedicated priority, the terminal starts a validity timer set as the received valid time together therewith. While the valid timer is operated, the terminal applies the dedicated priority in the RRC idle mode. If the valid timer is expired, the terminal discards the dedicated priority and again applies the common priority.

For the inter-frequency cell reselection, a network may provide UE with a parameter (e.g., a frequency-specific offset) used in cell reselection for each frequency.

For the intra-frequency cell reselection or the inter-frequency cell reselection, a network may provide UE with a Neighboring Cell List (NCL) used in cell reselection. The NCL includes a cell-specific parameter (e.g., a cell-specific offset) used in cell reselection.

For the intra-frequency or inter-frequency cell reselection, a network may provide UE with a cell reselection black list used in cell reselection. The UE does not perform cell reselection on a cell included in the black list.

Ranking performed in a cell reselection evaluation process is described below.

A ranking criterion used to give the priority of a cell is defined as in Equation 2.

$$R_s = Q_{meas,s} + Q_{hyst}, R_n = Q_{meas,n} - Q_{offset}$$ [Equation 1]

In Equation 1, $R_s$ is the ranking criterion of a serving cell on which UE now camps, $R_n$ is the ranking criterion of a neighboring cell, $Q_{meas,s}$ is the quality value of the serving cell measured by the UE, $Q_{meas,n}$ is the quality value of the neighboring cell measured by the UE, $Q_{hyst}$ is a hysteresis value for ranking, and $Q_{offset}$ is an offset between the two cells.

In Intra-frequency, if UE receives an offset "Qoffsets,n" between a serving cell and a neighbor cell, Qoffset=Qoffsets,n. If UE does not Qoffsets,n, Qoffset=0.

In Inter-frequency, if UE receives an offset "Qoffsets,n" for a corresponding cell, Qoffset=Qoffsets,n+Qfrequency. If UE does not receive "Qoffsets,n", Qoffset=Qfrequency.

If the ranking criterion Rs of a serving cell and the ranking criterion Rn of a neighbor cell are changed in a similar state, ranking priority is frequency changed as a result of the change, and UE may alternately reselect the twos. Qhyst is a parameter that gives hysteresis to cell reselection so that UE is prevented from to alternately reselecting two cells.

UE measures RS of a serving cell and Rn of a neighbor cell according to the above equation, considers a cell having the greatest ranking criterion value to be the best-ranked cell, and reselects the cell.

In accordance with the criterion, it may be checked that the quality of a cell is the most important criterion in cell reselection. If a reselected cell is not a suitable cell, UE excludes a corresponding frequency or a corresponding cell from the subject of cell reselection.

A Radio Link Failure (RLF) is described below.

UE continues to perform measurements in order to maintain the quality of a radio link with a serving cell from which the UE receives service. The UE determines whether or not communication is impossible in a current situation due to the deterioration of the quality of the radio link with the serving cell. If communication is almost impossible because the quality of the serving cell is too low, the UE determines the current situation to be an RLF.

If the RLF is determined, the UE abandons maintaining communication with the current serving cell, selects a new cell through cell selection (or cell reselection) procedure, and attempts RRC connection re-establishment with the new cell.

In the specification of 3GPP LTE, the following examples are taken as cases where normal communication is impossible.

A case where UE determines that there is a serious problem in the quality of a downlink communication link (a case where the quality of a PCell is determined to be low while performing RLM) based on the radio quality measured results of the PHY layer of the UE A case where uplink transmission is problematic because a random access procedure continues to fail in the MAC sublayer.

A case where uplink transmission is problematic because uplink data transmission continues to fail in the RLC sublayer.

A case where handover is determined to have failed.

A case where a message received by UE does not pass through an integrity check.

An RRC connection re-establishment procedure is described in more detail below.

Figure 7:
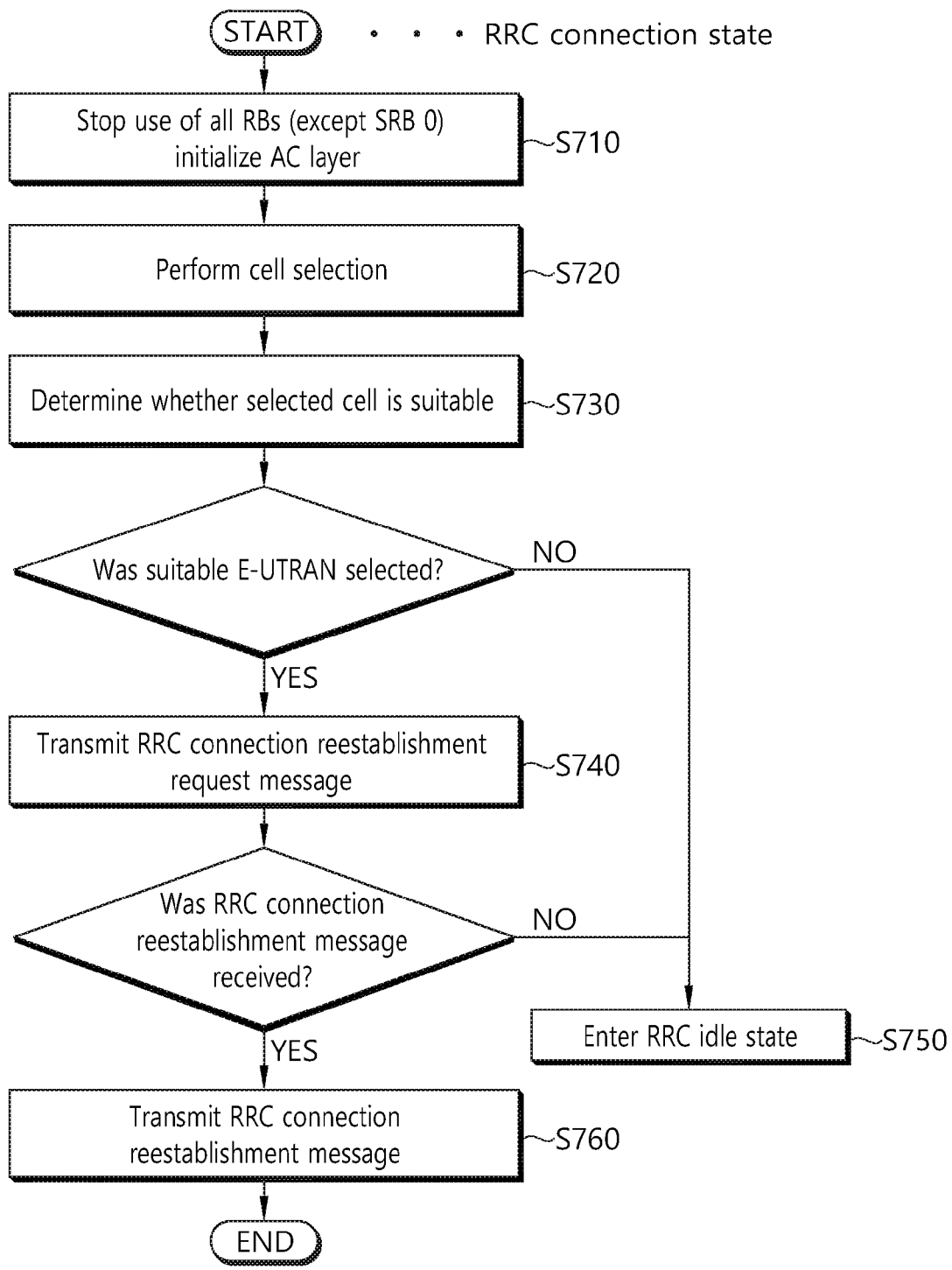
FIG. 7 is a diagram illustrating an RRC connection re-establishment procedure.

FIG. 7 is a diagram illustrating an RRC connection re-establishment procedure.

Referring to FIG. 7, UE stops using all the radio bearers that have been configured other than a Signaling Radio Bearer (SRB) #0, and initializes a variety of kinds of sublayers of an Access Stratum (AS) (S710). Furthermore, the UE configures each sublayer and the PHY layer as a default configuration. In this process, the UE maintains the RRC connection state.

The UE performs a cell selection procedure for performing an RRC connection reconfiguration procedure (S720). The cell selection procedure of the RRC connection re-establishment procedure may be performed in the same manner as the cell selection procedure that is performed by the UE in the RRC idle state, although the UE maintains the RRC connection state.

After performing the cell selection procedure, the UE determines whether or not a corresponding cell is a suitable cell by checking the system information of the corresponding cell (S730). If the selected cell is determined to be a suitable E-UTRAN cell, the UE sends an RRC connection re-establishment request message to the corresponding cell (S740).

Meanwhile, if the selected cell is determined to be a cell that uses RAT different from that of the E-UTRAN through the cell selection procedure for performing the RRC connection re-establishment procedure, the UE stops the RRC connection re-establishment procedure and enters the RRC idle state (S750).

The UE may be implemented to finish checking whether the selected cell is a suitable cell through the cell selection procedure and the reception of the system information of the selected cell. To this end, the UE may drive a timer when the RRC connection re-establishment procedure is started. The timer may be stopped if it is determined that the UE has selected a suitable cell.

If the timer expires, the UE may consider that the RRC connection re-establishment procedure has failed, and may enter the RRC idle state. Such a timer is hereinafter called an RLF timer. In LTE spec TS36.331, a timer named "T311" may be used as an RLF timer. The UE may obtain the set value of the timer from the system information of the serving cell.

If an RRC connection re-establishment request message is received from the UE and the request is accepted, a cell sends an RRC connection re-establishment message to the UE.

The UE that has received the RRC connection re-establishment message from the cell reconfigures a PDCP sublayer and an RLC sublayer with an SRB1. Furthermore, the UE calculates various key values related to security setting, and reconfigures a PDCP sublayer responsible for security as the newly calculated security key values. Accordingly, the SRB 1 between the UE and the cell is open, and the UE and the cell may exchange RRC control messages. The UE completes the restart of the SRB1, and sends an RRC connection re-establishment complete message indicative of that the RRC connection re-establishment procedure has been completed to the cell (S760).

In contrast, if the RRC connection re-establishment request message is received from the UE and the request is not accepted, the cell sends an RRC connection re-establishment reject message to the UE.

If the RRC connection re-establishment procedure is successfully performed, the cell and the UE perform an RRC connection reconfiguration procedure. Accordingly, the UE recovers the state prior to the execution of the RRC connection re-establishment procedure, and the continuity of service is guaranteed to the upmost.

Hereinafter, the UE associated with the RRC connection rejection and the operation of the network will be descried. In the RRC connection establishment procedure, when the network transmits the RRC connection rejection message to the UE in response to the RRC connection request message of the UE, the network may be configured not to allow the access of the UE for the corresponding cell and/or the RAT of the corresponding cell. To this end, the network may enable information related to the cell reselection priority and access restriction information for restricting a cell access to be included in the RRC connection rejection message in order to block the access to the network.

The network may enable the lowest priority request information directing the UE to apply the lowest priority in performing cell reselection to be included in the RRC connection rejection message. The lowest priority request information may include lowest priority type information indicating a type having the lowest priority applied thereto and lowest priority timer information which is the application duration time of the lowest priority. The lowest priority type information may be set to direct the application of the lowest priority for the frequency of the cell having transmitted the RRC connection rejection message or direct the lowest priority for all frequencies of the RAT of the corresponding cell.

If the UE receives the RRC connection rejection message including the lowest priority request information, the UE may start the time which is set as the lowest priority application duration time and perform cell reselection by applying the lowest priority to the subject indicated by the lowest priority type information.

Meanwhile, when the lowest priority information is provided through the RRC connection rejection message, a collision with the reselection priority signaled by the network may occur. In this case, the UE may be implemented to be operated by first applying the lowest priority to a specific frequency according to the lowest priority information provided through the RRC connection rejection message. In addition, the lowest priority information according to the RRC connection rejection message may collide with an implicit application of priority according to an UE-originated indication such as an MBMS (multimedia broadcast multicast service) interest indication, a CGS (closed subscriber group) cell-related proxy indication, and an IDC interference-related IDC indication. As such, the priority which is to be applied first may be determined according to the implementation of the UE or network.

The network may enable waiting time information to be included in the RRC connection rejection message in order to restrict the UE's access to the network. The UE having received the RRC connection rejection message including the wait time information may set the wait timer as the indicated duration time and start the wait timer. The UE may not perform the RRC connection establishment procedure for the access to the network while the wait time is operating.

The network may enable extended wait time information to be included in the RRC connection rejection message for the delay tolerant UE which is a more adaptable UE for the delayed service. The extended wait time information may be implemented to indicate extended wait duration time value greater than the value of the above-described wait time information. When the RRC connection rejection message includes extended wait time information and the corresponding UE is a delay tolerant UE, the UE may perform a network access based on the extended wait time information. On the contrary, if the UE is not a delay tolerant UE, the UE may perform a network access based on the wait time information.

Hereinafter, access restriction and control will be described.

In the current wireless communication system, there are two mechanisms allowing a business operator to perform cell reservation or access restriction. The first mechanism is a scheme of using direction of cell status and special reservation for controlling cell selection and reselection procedure. The second mechanism is a scheme mentioned as access control and is a scheme which does not allow the selected class user to transmit an initial access message for the reason of load control. In the description below, it is assumed that one or more access classes are allocated to the UE and the access classes are stored in a USIM (universal subscriber identity module).

Hereinafter, information related to cell status and cell reservation and the related access restriction mechanism will be described.

Information related to the cell status and cell reservation is included in SIB1 (system information block type 1).

The information on the cell status is set to indicate whether the access to the cell is barred. Namely, the cell status information may indicate whether the access is barred or not barred. When a plurality of PLMNs within SIB1 are indicated, the cell status information may be applied in common for all PLMNs.

Information on the cell reservation may be set to indicate whether a cell has been reserved for the user of a specific business operator. Namely, the cell reservation information may be set to indicate whether the cell has been reserved or not reserved. When a plurality of PLMNs within the SIB1 are indicated, the cell reservation information may be specified per PLMN.

When the cell status information indicates "not barred" and the cell reservation information indicates "not reserved", all UEs may consider the corresponding cell as a candidate cell during the cell selection and cell reselection procedure.

When the cell status information indicates "not barred" and cell reservation information indicates "reserved" for a random PLMN, if the UE, which is currently operated in HPLMN/EHPLMN and corresponds to access classes 11 to 15, has been reserved for the corresponding PLMN, the UE may consider the corresponding cell as a candidate cell during the cell selection and cell reselection procedure. On the other hand, if the UE has been reserved for rPLMN or selected PLMN (selected PLMN), the UE corresponding to access classes 0 to 8 and 12 to 14 regards the status of the corresponding cell as "barred" and performs the operation.

When the cell status information indicates "barred" or the corresponding cell is regarded as the "barred" status, the UE cannot select/reselect the corresponding cell, and this is also the same in the case of an emergency call. The UE can be operated as follows in selecting another cell.

When the corresponding cell is a CGS cell, if the cell selection/reselection condition is satisfied, the UE may select another cell of the same frequency.

When the corresponding cell is not a CGS cell, the UE may perform the cell selection/reselection procedure according to the intra-frequency cell reselection information within SIB1. When the access to the best ranked cell on the current frequency is barred, the intra-frequency cell reselection information may indicate whether the UE may perform intra-frequency cell reselection. If the intra-frequency cell reselection information indicates that the intra-frequency cell reselection is allowed, another cell on the same frequency may be selected when the cell reselection condition is satisfied. Meanwhile, the UE excludes the barred cell from the candidate cell for a specific amount of time (e.g., 300 seconds) during the cell selection/reselection procedure. If the intra-frequency cell reselection information indicates that the intra-frequency cell reselection is not allowed, the UE may regard that the cell on the same frequency is barred and perform the operation of selecting the cell on the inter-frequency. The UE excludes the barred cell and the cell on the same frequency from the candidate cells for a specific amount of time (e.g., 300 seconds) during the cell selection/reselection procedure.

Hereinafter, an access control scheme based on the access class will be described.

The information on the cell access restriction associated with the access class may be included in the system information and broadcast. The UE disregards an access class related to the cell access restriction in selecting a cell to be camped on. Namely, since an access to the corresponding UE is not allowed for any access class of the UE, the UE does not exclude the corresponding cell for the camp-on. The change in the indicated access restriction does not trigger cell reselection by the UE. The access class related to the cell access restriction may be determined by the UE in starting the RRC connection establishment procedure.

The restriction on the emergency call may be indicated by the emergency call access class information when necessary. The emergency call access class information may be implemented as the ac-BarringForEmergency parameter of SIB2 (system information block 2) included in the system information. If the barring is directed for the access class 10 within the cell, an UE corresponding to access classes 0 to 9 or an UE without IMSI (international mobile subscriber identity) is not allowed to start an emergency call within the corresponding cell. When access class 10 and related access classes 11 to 15 are directed to be barred, UEs of access classes 11 to 15 are not allowed to start an emergency call within the corresponding cell. Otherwise, the emergency call may be allowed for the corresponding UE.

The UE, which allows an extended access barring (EAB), may check whether an access to the current cell has been barred by performing an EAB check in performing an RRC connection establishment. When an access to the cell is barred as a result of an EAB check, EAB has been applied to the NAS which is an upper layer, and it is notified that the RRC connection establishment has failed.

When an RRC connection establishment for an MT (mobile termination) call is performed, if T302 timer, which is a timer according to the RRC connection rejection, is currently under operation, the UE indicates that the RRC connection establishment to NAS which is an upper layer has failed, and an access restriction to the MT call is applied.

When an RRC connection establishment for an MO (mobile originating) call is performed, the UE may determine whether an access to the current cell has been barred based on the access class parameter provided based on the allocated access class and system information. When it is determined that an access has been barred, the UE may check whether access has been barred in additional consideration of the access class parameter related to CSFB (circuit switched fallback) and indicate the result of the checking to the NAS layer which is an upper layer.

Hereinafter, MMTel (multimedia telephony service) will be described.

MMTel is a global standard based on IMS (IP multimedia subsystem) and provides a converged, fixed mobile real-time multimedia communication, through which media capabilities such as a voice, a real-time video, a text, and a file transfer are used, and a photograph, an audio, a video clip and the like may be shared. In MMTel, the user may add or remove media during the session. Namely, a chatting, voice addition, another caller addition, video addition, media sharing, a file transfer, and a removal of a certain capability among them may be possible.

In an emergency situation such as an earthquake or a tsunami, the service quality may be deteriorated. The deterioration of service availability and performance on emergency may be allowed, but a mechanism capable of minimizing such a deterioration and increasing efficiency of the rest of wireless resources may be necessary.

In the UMTS, the original purpose of introduction of a domain specific access control (DSAC) is to enable PS (packet switched) service continuation during the generation of CS (circuit switched) node confusion due to the situation such as an emergency situation. In the actual UMTS development situation, the use example of the DSAC is to individually apply an access control for services of respectively different types such as a voice and another PS service. For example, in a person's psychological phase, making a voice all on emergency is general, which is not easily changed. Hence, a mechanism of individually restricting a voice call and another service may be necessary.

EPS (evolved packet system) is a PS domain system and DSAC is not applied. Instead, a service specific access control (SSAC) is applied. In the EPS, when considering the characteristic of the voice and non-voice call, the requirements of SSAC may be set to individually restrict the voice call and the non-voice call.

There are QoS (quality of service) requirements for a general charged service. A service provider may shut down the corresponding service if the above requirement is not satisfied. On emergency, what is important is to maintain an undisturbed communication channel, through which it may be desirable for the service provider to provide the service as the best effort service rather than stopping the service. There is a possibility that the service provider allows a service, and an extended credit may be granted to a subscriber without an access right. In a specific environment, an overload access control of providing an access to only interested persons or a predefined users set may be applied. When considering the characteristic of the voice and non-voice call within EPS, the overload access requirements for the SSAC may be set to individually restrict the voice call and non-voice call.

The SSAC is used to control an access attempt for the current MMTel-voice and MMTel-video. The cell may broadcast access control information on MMTel-voice and MMTel-video through system information which is transmitted on BCCH. If system information is received, the UE may obtain access control information for MMTel-voice and MMtel-video. The access control information may include a barring factor parameter and a barring time parameter. A different barring factor parameter and a barring time parameter set may be provided for MMTel-voice and MMTel-video.

If SSAC information is received, the RRC layer of the UE may simply forward the received SSAC information to the MMTel layer of the UE. In this case, when the UE tries to generate RRC connection for MMTel application, the MMTel layer of the UE may determine whether the RRC connection establishment may be started based on SSAC information.

Hereinafter, the present invention will be described.

The present invention may be utilized for application-specific congestion control.

In the present invention, it may be assumed that there is a service layer binding services as a category. Further, it may be assumed that an application layer and a service layer are separated.

A random application may be associated with a random service class. The UE applies a service class-specific access control or service specific access control in order to perform an application-specific access control.

<A First Example of Intra-group Prioritization>

A plurality of application belonging to the same application group may be associated with the same service class. In this case, the service class-specific access control may be applied in common to the plurality of applications.

In the present invention, it is proposed that an application-specific access control is defined and an intra-group prioritization within the group is applied between applications included in the same application group by adding such a common service class-specific access control.

Figure 8:
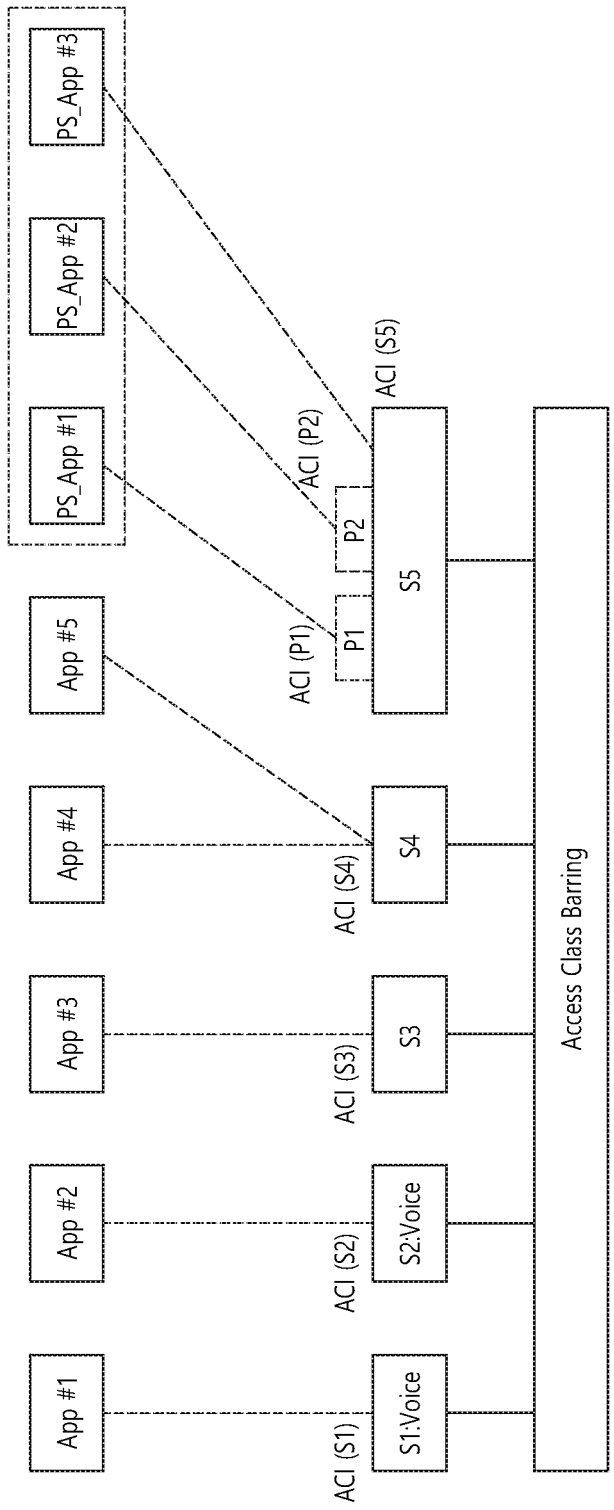
FIG. 8 shows an example of prioritization within a group.

FIG. 8 shows an example of prioritization within a group.

Referring to FIG. 8, a plurality applications may be operated in an UE. For example, general applications #1-5 (App#1-5) applications (PS_App#1-3) for public safety (PS). For example, application #1 is an application about a voice, and application #2 is an application about an image. It is assumed that applications #3-5 are applications of a different usage.

Among general applications, application #4 (App#4) and application #5 (App#5) may be included in the same application group. For example, App#4 and App#5 may have the same/similar QoS requirement or may be applications with the same/similar predetermined traffic distinction rule. Likewise, the applications included in the same application group may be associated with the same service class. In FIG. 8, App#4 and App#5 are associated with the service class 4 (S4).

Access control information (ACI) may be provided per service class. ACI (S1) means ACI for service class 1 and ACI (S2) means ACI for service class 2. Likewise, access control information specific to the service class or service may be called service specific access control information (SSACI).

Meanwhile, applications for public safety may also be included in the same application group. The application group including applications for public safety may be called a public safety group. In FIG. 8, PS_App#1, 2 and 3 are included in the same application group. Further, PS_App#1, 2 and 3 are associated with service class 5 (S5). Hence, ACI (S5) may be applied in common to PS_App#1, 2 and 3.

However, even though all of PS_App#1, 2 and 3 are public safety applications, it may be necessary for a different priority to be applied. Namely, it may be necessary to apply a priority order/access probability of the network access, etc. among public safety applications. In FIG. 8, the prioritization within the group is applied to PS_App#1 and 2. AS such, the priority of P1 is given to PS_App#1 and the priority of P2 is given to PS_App#2. At this time, ACI associated with the priority of P1 may be provided in PS_App#1, and ACI associated with the priority of P2 may be provided in PS_App#2. They are expressed as ACI (P1) and ACI (P2) in FIG. 8. Below, ACI associated with the priority within the group (or the priority within the service class) for a specific application may be called prioritization access control information (PACI).

In the present invention, it is proposed that when PACI is applicable to a specific application (e.g., an application for public safety or an application for emergency), the PACI is first applied than the SSACI so as to perform access control to the specific application.

Hereinafter, intra-group prioritization will be described in detail.

In the intra-group prioritization, it is assumed that the range of the priority is {1, ..., N}. Here, 1 indicates the highest priority and N indicates the lowest priority.

The priority within such a group may be set for the application of the UE. For example, in FIG. 8, the first priority value (P1) is set in PS_App#1 and the second priority value (P2) is set in PS_App#2. Further, though not illustrated in FIG. 8, the third priority (P3) may be set in PS_App#3. At this time, the first, second and third priority values may be the same or different values.

Such priority values may be set by an explicit network signal. Further, the priority value may be set according to a predetermined rule. For example, if a certain application is installed within the UE, the application may identify the priority of the application itself, and the UE may assume the priority of the application according to the predetermined rule.

The network may set the priority associated with each service class. The range of this priority may be the same as the priority which may be set in the application. In this case, the application may be associated with the service class with the same priority. If access control information of the service class with the same priority is not signaled, the UE may enable the application to be associated with the service class associated with the highest priority among priorities lower than the priority of the application among service classes in which access control information is signaled. It is possible to set a plurality of associated priorities for one service class.

The network may set service-specific approach control information (SSACI) to the UE. The service-specific access control information may include sets of various access control parameters and each set may be associated with a specific service class. For example, as access control parameter set 1 is associated with service class 1 and access control parameter set 2 is associated with service class 3, the set of the access control parameter associated with each service class may be provided by the SSACI.

The network may signal SSACI for a specific service class or signal SSACI for a random service class without such a restriction. The specific service class may be a service (class) which is mapped with the highest priority access or the highest priority service. For example, the specific service class may be a service class including public safety access or public safety service.

The network may set prioritization access control information (PACI) to the UE.

The prioritization access control information (PACI) may be provided per service class. If the service class is changed, the prioritization access control information (PACI) may also be changed. Hence, the PACI may be an expression equivalent to the prioritization control information within the service class.

Meanwhile, the PACI is not provided to all service classes, and PACI may not be provided for a specific service class. In other words, the PAC may be provided to a specific service class, e.g., only the service with the highest priority.

The PACI may include priority information for the application. Further, the PACI may be configured with sets of access control parameters, and each set may be associated with the priority within at least one group. For example, the access control parameter set 1 may be associated with priority 1 within the group, and the access control parameter set 2 may be associated with priority 2.

Here, the access control parameter may include a barring factor and barring time. The barring factor may be a probability value between 0 and 1, which determines the barring of a random access when the network is overloaded. The UE desiring an access to the network may generate a random number between 0 and 1. When this random number is smaller than a barring factor, the UE may attempt an access, and otherwise the UE may bar the access. The barring time may be the average wait time until the application/service or the like, of which the access has been barred by the access control, attempts an access again.

Meanwhile, the default value of the access control parameters may be predetermined. If the value of the access control parameters is not explicitly signaled by the network, the default value may be used.

SSCAI and PACI may be broadcast through system information may be signaled through the dedicated signal (AS or NAS signaling).

Meanwhile, the association between the service class and the application may be set by the network or set by a predetermined rule.

The application is associated with the service class. If the application is associated with a specific service class, the application may be associated with PACI, specifically a set of access control parameters for the priority within the group. For example, in FIG. 8, PS_App#1 is associated with service class S5 and ACI (P1) which is PACI.

A plurality of applications may be associated with the same service class. For example, in FIG. 8, App#4 and 5 is associated in common with service class S4. Hence, App#4 and 5 is associated in common with ACI (S4) which is SSACI associated with S4.

It is possible for a plurality of applications associated with the same service class to be associated with different PACIs for prioritization within the group (within the service class). For example, in FIG. 8, PS_App#1 and 2 are associated with the same service class (S5), but PS_App#1 is associated with ACI (P1) and PS_App#2 is associated with ACI (P2).

The PACI may include information indicating the priority value of the application within the group or the service class. The UE may perform association between the application and the PACI based on the information.

The PACI may be signaled according to the order of the priority value.

If traffic is generated by a specific application within the UE, access control to the traffic may be performed.

Figure 9:
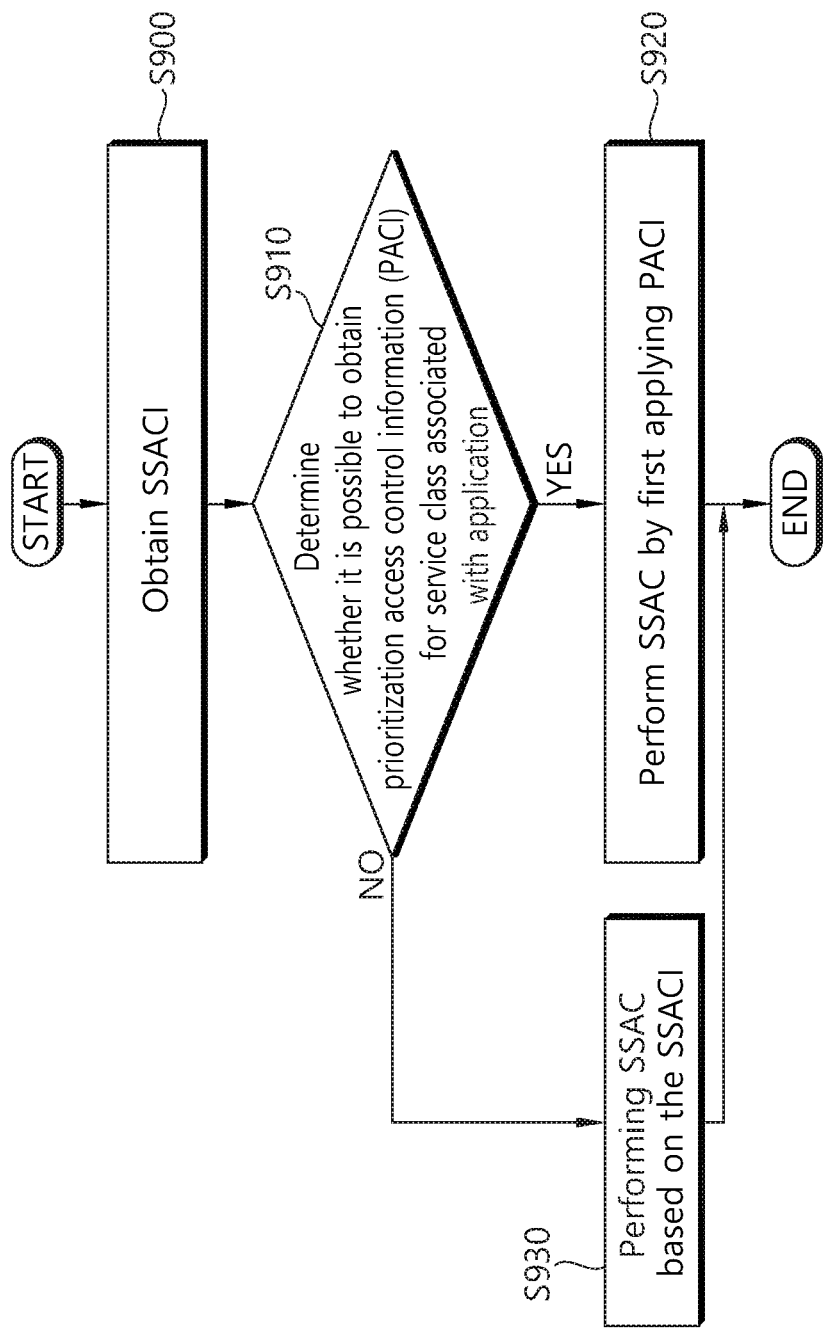
FIG. 9 illustrates a method for access control according to an embodiment of the present invention.

FIG. 9 illustrates a method for access control according to an embodiment of the present invention.

First, the UE obtains SSACI (S900).

The UE determines whether it is possible to obtain prioritization access control information (PACI) for the service class associated with the application (S910).

If it is possible to obtain PACI, the UE performs service-specific access control (SSAC) by first applying PACI to SSACI (S920).

On the contrary, if the UE fails to obtain PACI, the UE performs SSAC based on SSACI like before (S930).

Hereinafter, the method of FIG. 9 will be described in detail.

If traffic is generated in the application within the UE, the UE identifies a service class associated with the generated traffic. Further, the UE identifies whether the prioritization within the group is applicable to the identified service class. For example, if ACI for prioritization within the group, i.e., PACI, has been obtained for the application, the UE may determine that the prioritization within the group is applicable.

If the prioritization within the group is applicable to the identified service class, when performing a service-specific access control (SSAC), the UE may perform the following operation.

The UE replaces service-specific access control information (SSACI) with ACI for prioritization (PACI) within the group. The ACI for prioritization (PACI) within the group may include all parameters included in the service-specific access control information (SSACI) for the traffic. In this case, the parameters included in the SSACI may be replaced with parameters included in the PACI. For example, in FIG. 8, the UE may replace ACI (S5) with ACI (P1) for the traffic generated by PS_App#1. Then the UE may perform service-specific access control based on ACI (ACI (P1)) defined for priority P1.

Alternatively, the ACI for prioritization (PACI) within the group may include some service-specific access control information (SSACI) of the traffic. For example, the ACI for prioritization (PACI) within the group may include only some parameters among parameters included in the service-specific access control information (SSACI) for the traffic. In this case, it is possible to replace only parameters provided by PACI in SSACI as a method of analyzing this by the UE. Namely, only parameters included in common in SSACI and PACI are replaced. In FIG. 8, the UE may replace some overlapping parameters by replacing ACI (S5) with ACI (P1) for the traffic generated by PS_App#1. And, service-specific access control is performed using ACI which has substituted only some overlapping parameters. When only some parameters among parameters included in service-specific access control information (SSACI) for the traffic are included in ACI for the prioritization (PACI) within the group, it is possible to substitute only parameters provided by PACI in SSACI and apply a predetermined value (default value) for the parameters which are not provided by PACI as another method of analyzing this by the UE.

The ACI for the prioritization within the group, i.e., PACI, may include a barring factor/or barring time.

Further, ACI for the prioritization within the group (PACI) may include an indicator indicating whether the application of the service-specific access class barring for the related traffic is skipped. The skipping of the service-specific access class barring means that the access class barring for the corresponding service or service class is not performed.

In addition to the method of substituting parameters of SSACI with the whole or part of the parameters of PACI, the UE may adjust SSACI using PACI.

The ACI for prioritization within the group (PACI) may include access control parameters which are used for adjusting ACI (SSACI) defined for the service-specific access control. In this case, parameters (e.g., barring factor and/or barring time) included in the SSACI and parameters (barring factor and/or barring time) included in the PACI may be added.

For example, in FIG. 8, the UE uses the value, which is generated by adding the barring factor defined in ACI (S5) to the barring factor defined in ACI (P1), as the barring factor for service-specific access control for PS_App#1. Namely, the barring factor, which is actually used for service-specific access control for PS_App#1, is calculated as "barring factor in ACI (S5)"+"barring factor in ACI (P1)".

Further, the barring factor, which is actually used for service-specific access control, may be used after scaling the barring factor defined in the ACI for service-specific access control (SSACI) using the given value. The scaling may be performed by multiplying the scaling factor given in the PACI with the barring factor given in the SSACI. In FIG. 8, the barring factor, which is actually applied to the traffic generated by PS_App#1, may be a value which is generated by multiplying the scaling factor defined in ACI (P1) with the barring factor define din ACI (S5). To this end, PACI (ACI (P1)) may include a scaling factor.

The above description may be understood as equivalent to identifying whether the intra-service class prioritization is applicable to the service class associated with the application and if applicable, SSCAI is amended using ACI (i.e., PACI) which has been determined according to the intra-service class prioritization.

If the ACI related to prioritization within the group (PACI) is not applicable to a certain application, the UE performs service-specific access control using ACI (SSACI) which is defined in the service-specific access control associated with the certain application.

For example, in FIG. 8, the UE performs service-specific access control using ACI (S1) for the traffic generated by App#1 which is a general application. And, the UE performs service-specific access control for the traffic generated by PS_App#3 using ACI (S5). When the network signals only ACI (S5) without signaling ACI (P1), the UE performs service-specific access control for the traffic generated by PS_App#1 using ACI (S5). The UE applies an access class barring if applicable to this traffic. If the access class barring should be skipped according to the network direction, the UE does not apply the access class barring for the traffic.

<Second Example of Intra-group Prioritization>

Figure 10:
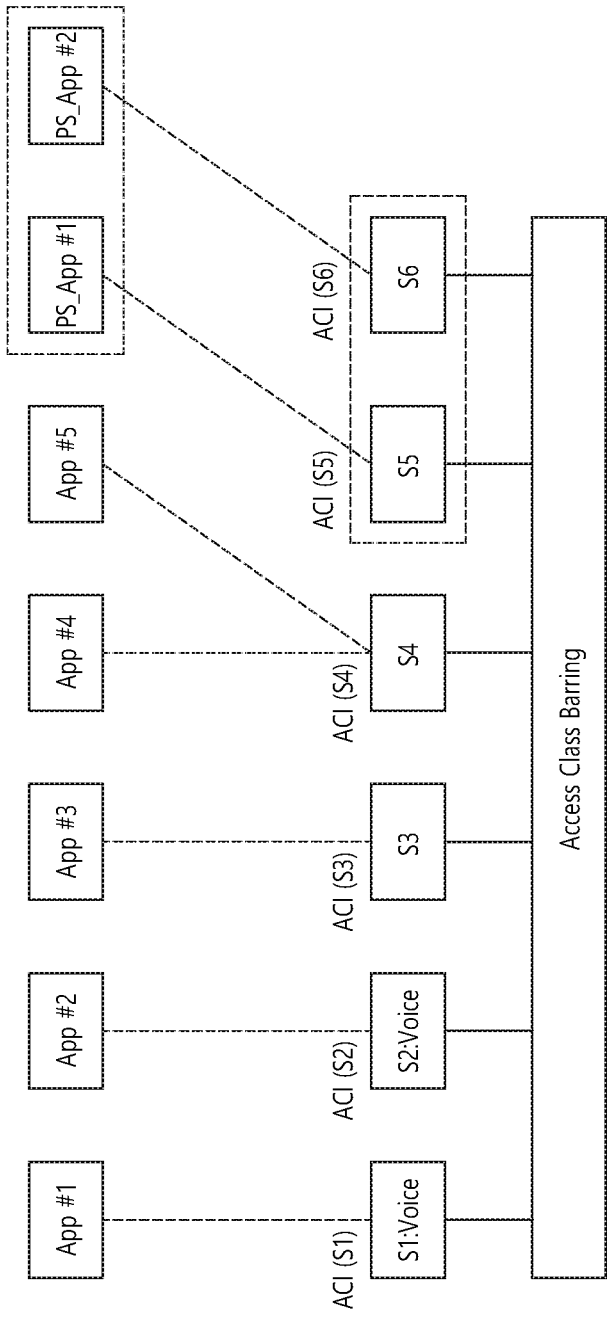
FIG. 10 illustrates another example of a method of applying intra-group prioritization.

FIG. 10 illustrates another example of a method of applying intra-group prioritization.

Referring to FIG. 10, applications includes in the same application group may be associated with the same service class. In FIG. 10, App#4 and 5 are applications having mutually same/similar QoS requirements or traffic distinction rules applied thereto and may be included in the same application group. And, these applications may be associated with the same service class (e.g., S4).

On the other hand, some applications may be included in the same application group but may be associated with another service class. In this case, different access controls may be applied to different applications belonging to the same application group.

For example, in FIG. 10, PS_App#1 and 2, which are public safety applications, are included in the public safety group which is the same application group. PS_App#1 is associated with service S5 and PS_App#2 is associated with service class S6. In this case, both PS_App#1 and 2 are applications included in the public safety group but it may be necessary for different prioritizations to be applied.

The intra-group priority is set by the applications of the UE. In the intra-group prioritization, for example, it is assumed that the range of the priority is {1, . . . , N}. For example, 1 denotes the highest priority, and N denotes the lowest priority. For example, in FIG. 10, the first priority value may be set in PS_App#1, and the second priority value may be set in PS_App#2. The first and second priority values may be the same or different.

The setting of the priority value may be explicitly set by the network signal. Alternatively, the setting of the priority value may be set according to a predetermined rule. For example, if a creation application is installed in a UE, the application may identify its priority according to a predetermined rule, and the UE may also assume the priority of the application according to the predetermined rule.

The network sets a UE through service-specific access control information (SSACI). In FIG. 10, ACI (S1) may be set in App#1, ACI (S2) may be set in App#2, ACI (S3) may be set in App#3, ACI (S4) may be set in App#4 and 5, ACI (S5) may be set in PS_App#1, and ACI (S6) may be set in PS_App#2. In FIG. 8, ACI (S5) is set in common in PS_App#1, but in FIG. 10, ACI, ACIs according to different service classes are set in PS_App#1 and 2.

The network may set the associated priority for each service class. This priority range may be the same as the priority which may be set for the application. In this case, the application may be associated with the service class with the same priority. If access control information of the service class with the same priority is not signaled, the UE may enable the application to be associated with the service class associated with the highest priority among priorities lower than the priority of the application among the service classes in which access control information is signaled.

Service-specific access control information (SSACI) may include various sets of access control parameters, and each set may be associated with a specific service class. The network may signal access control information for only a specific service class or signal access control information for a random service class without such a restriction. For example, the specific service class may be a service which is mapped with the highest priority access or the highest priority service. The specific service class may be a public safety access or public safety service.

Different applications included in the same application group may be associated with different service classes. Such an association may be configured by the network. Further, such an association may be configured according to a predetermined rule.

The service-specific access control information may include a plurality of sets of access control parameters, and each set of access control parameters may be associated with the intra-group priority value.

If traffic is generated in a specific application within the UE, the UE may apply the following access control to the traffic.

First, the UE identifies a service class associated with the traffic generated in the application. The UE performs service-specific access control using ACI applicable to the identified service class. For example, in FIG. 10, the UE performs service-specific access control for the traffic generated by at least one of App#4 and 5 using ACI (S4).

Service-specific access control is performed for the traffic generated by PS_App#1 using ACI (S5). Service-specific access control is performed for the traffic generated by PS_App#2 using ACI (S6). Namely, PS_App#1 and 2 are applications belonging to the same application group, but ACI according to different service classes is applied in the access control. It is performed like the above in consideration of the fact that PS_App#1 and PS_App#2 are the same public safety applications but the access barring probability may need to be differently applied depending on the importance of the traffic generated by each application. As described above, ACI (S5) and ACI (S6) are ACIs for different service classes and barring parameters such as the barring factor and barring time may have different values. Hence, the access barring probabilities may be different. A kind of result of applying the priority may be obtained by enabling a service class to be appropriately associated in consideration of the access probability for each of PS_App#1 and 2.

When the UE is applicable to the traffic, the access class barring is applied. If the access class barring should be skipped for the traffic according to the network direction, the UE may skip applying the access class barring to the traffic.

The access control method proposed in the present invention may be applied when the UE transmits data to the base station or the UE transmits data to another UE through an inter-UE link.

Figure 11:
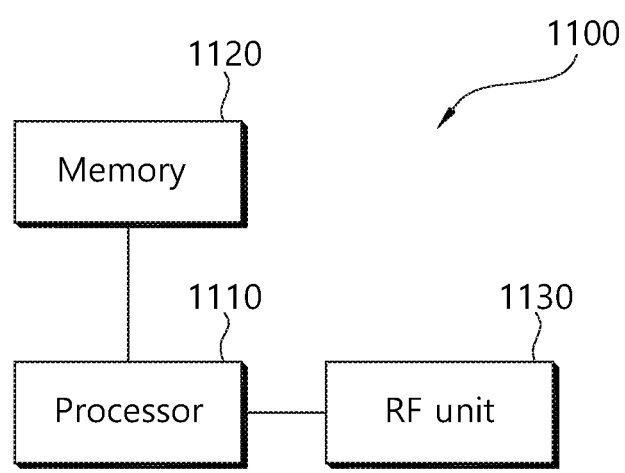
FIG. 11 is a block diagram of a wireless apparatus to which an embodiment of the present invention is implemented.

FIG. 11 is a block diagram of a wireless apparatus to which an embodiment of the present invention is implemented. This apparatus may be implemented as a UE or network system performing the method for access control according to an embodiment of the present invention.

Referring to FIG. 11, a wireless apparatus 1200 includes a processor, a memory and a RF unit 1230. The processor 1210 implements a proposed function, process and/or method. The processor 1210 obtains service-specific access control information (SSACI) for the application and determines whether prioritization access control information (PACI) is applicable to the application. When the PACI is applicable, the processor 1210 performs access control for the application by first applying the PACI rather than the SSACI. The processor 1210 may be configured to perform the embodiment of the present invention with reference to FIGS. 8 to 10.

The RF unit 1230 is connected to the processor 1210 and transmits and receives a wireless signal.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

What is claimed is:

1. A method for performing access control in a wireless communication system, the method performed by a user equipment (UE) and comprising:
    receiving service-specific access control information (ACI) for each of a plurality of service classes;
    receiving prioritization ACI for a specific service class among the plurality of service classes only when the specific service class has a highest service class priority,
    wherein the specific service class includes a plurality of applications; and
    performing the access control for the plurality of applications based on the service-specific ACI and the prioritization ACI,
    wherein the service-specific ACI includes a first barring factor for the specific access class and a first barring time for the specific access class,
    wherein the prioritization ACI includes a second barring factor for a specific application among the plurality of applications and a second barring time for the specific application,
    wherein the prioritization ACI further includes respectively applied priority information for each of the plurality of applications in the specific service class,
    wherein the UE adjusts a barring factor of the specific application based on adding the first barring factor to the second barring factor or scaling the first barring factor with the second barring factor, and
    wherein the UE adjusts a barring time of the specific application based on adding the first barring time to the second barring time or scaling the first barring time with the second barring time.

2. The method of claim 1, wherein the service-specific ACI or the prioritization ACI is received from a network via a broadcast or a dedicated signal.

3. A wireless apparatus operating in a wireless communication system, the wireless apparatus comprising:
a radio frequency (RF) transceiver that transmits and receives a wireless signal; and
a processor operating in functional combination with the RF transceiver, wherein the processor:
controls the RF transceiver to receive service-specific access control information (ACI) for each of a plurality of service classes;
controls the RF transceiver to receive prioritization ACI for a specific service class among the plurality of service classes only when the specific service class has a highest service class priority,
wherein the specific service class includes a plurality of applications; and
performs access control for the plurality of applications based on the service-specific ACI and the prioritization ACI,
wherein the service-specific ACI includes a first barring factor for the specific access class and a first barring time for the specific access class,
wherein the prioritization ACI includes a second barring factor for a specific application among the plurality of applications and a second barring time for the specific application,
wherein the prioritization ACI further includes respectively applied priority information for the each of the plurality of applications in the specific service class,
wherein the UE adjusts a barring factor of the specific application based on adding the first barring factor to the second barring factor or scaling the first barring factor with the second barring factor, and
wherein the UE adjusts a barring time of the specific application based on adding the first barring time to the second barring time or scaling the first barring time with the second barring time.

4. The wireless apparatus of claim 3, wherein the service-specific ACI or the prioritization ACI is received from a network via a broadcast or a dedicated signal.

* * * * *